United States Patent

Pasternack et al.

[15] 3,636,454

[45] Jan. 18, 1972

[54] DIGITAL CIRCUIT DISCRIMINATOR FOR FREQUENCY-SHIFT DATA SIGNALS

[72] Inventors: Gerald Philip Pasternack, Colts Neck; Burton R. Saltzberg, Middletown, both of N.J.

[73] Assignee: Bell Telephone Laboratories, Incorporated, Murray Hill, Berkeley Heights, N.J.

[22] Filed: July 28, 1970

[21] Appl. No.: 58,848

[52] U.S. Cl...................................325/320, 329/104, 325/30

[51] Int. Cl...........................................H03k 9/06, H04l 27/14

[58] Field of Search ................325/30, 320, 346; 178/66, 67, 178/88; 331/18, 25, 23; 329/104, 122

[56] References Cited

UNITED STATES PATENTS

| | | | |
|---|---|---|---|
| 3,449,691 | 6/1969 | Pasternack et al | 331/18 |
| 3,571,712 | 3/1971 | Hellwarth | 325/320 |

*Primary Examiner*—Robert L. Griffin
*Assistant Examiner*—John C. Martin
*Attorney*—R. J. Guenther and Kenneth B. Hamlin

[57] ABSTRACT

FSK data signals are applied to a phase-locked loop whose binary signal output has an average amplitude which varies with the frequency of the incoming data signal. A zero-crossing detector produces a pulse for each zero crossing of the binary signal and the pulses are processed by a transversal digital filter having finite memory and arranged to provide triangular weighting to each input pulse. The baseband signal is then recovered from the filter output. In one embodiment, the zero-crossing detector and the transversal filter are advantageously arranged to be time shared by a plurality of FSK signal channels.

6 Claims, 14 Drawing Figures

INVENTORS G. P. PASTERNACK
B. R. SALTZBERG
BY R C Lipton
ATTORNEY

PATENTED JAN 18 1972 3,636,454

SHEET 2 OF 5

DIGITAL CIRCUIT DISCRIMINATOR FOR FREQUENCY-SHIFT DATA SIGNALS

1. Field of the Invention

This invention relates to frequency-shift signal receivers and, more particularly, to signal receivers, such as discriminators, which utilize digital filters and are capable of being shared, on a time-division basis, by a plurality of data signal channels.

2. Description of the Prior Art

In the data processing and data switching arts the central processor or switcher terminates large numbers of incoming data signaling channels. The data channel, in many instances, will comprise a telephone line and the data signals thereon are represented by frequency-shift signals. Recovery of the DC data baseband signals from the frequency-shift signals is provided by a data set receiver, which generally utilizes filter circuits (such as band-pass, low-pass and resonators).

Since a plurality of channels are terminated, the data set receivers (together with transmitters and control equipment) are sometimes grouped to form an arrangement called a multiple data set. To reduce the size, cost and complexity of the multiple data set, it is advantageous to employ equipment which can be used, in common, by all the data set receivers.

Perhaps the most significant circuits in the receiver are the filters. In the copending application of C. A. Buzzard and B. R. Saltzberg, Ser. No. 884,250, filed Dec. 11, 1969, it is shown that digital filtering can be employed to provide digital equivalents of the band-pass, low-pass and resonator circuits in the data set receiver. It is further shown that, since digital techniques are employed, a plurality of signal sources can be processed on a time-shared basis and the digital circuits can thus be used, in common, by all the data set receivers.

It is an object of this invention to provide an improved arrangement for processing analog signals using digital filtering techniques. The improved arrangement is preferably utilized to recover DC baseband signals from frequency-shift signals, employing digital circuits in place of analog filters. It is, therefore, a further object of this invention to provide an improved digital circuit discriminator for FSK signals.

A criteria in discriminator design is to obtain a clear, undistorted output baseband signal wave. One test of the output wave involves the examination of the binary eye pattern produced by the wave. The binary eye pattern is formed by superimposing (on an oscilloscope, for example) the discriminator output waveforms which are produced in response to random data applied to the discriminator input and by synchronizing the superimposed waveforms with respect to the input data bit transitions. This, therefore, results in a plurality of superimposed binary data bits or elements which form an eyelike appearance. A clear, undistorted baseband signal has a minimum of "jitter" at the crossovers of the eye pattern and maximum vertical and horizontal eye dimensions, sometimes called eye opening.

It is, therefore, a further object of this invention to provide less jitter and increased eye opening in the binary eye pattern.

SUMMARY OF THE INVENTION

The present invention advantageously utilizes a phase-locked loop for generating a binary output signal wave having a short term average amplitude which varies with the frequency of the incoming FSK signal and a digital filter for converting the short term average amplitude of a signal wave to a baseband data signal. The phase-locked loop output signal provides a relatively smooth transition, in short term average amplitude, as the incoming baseband signal goes from one condition (such as Space) to the other condition (such as Mark) and it is believed that this smooth transition plays a part in providing less jitter and increased eye opening of the binary pattern. The filter input includes a zero-crossing detector which generates a pulse for each zero crossing (or transition) of the binary output signal of the phase-locked loop. This creates pulse pairs for each binary output signal to provide a "format" which obtains the advantages of the phase-locked loop and exploits characteristics of the digital filter.

In accordance with a feature of this invention, a transversal filter is utilized since this filter has finite memory. The filter response is therefore independent of data received more than some fixed time previous, aiding in increasing the opening of the binary eye pattern.

In accordance with another feature of this invention, the transversal filter provides triangular weighting and, therefore, symmetrical weighting, of each input pulse to provide linear phase response, which tends to improve the eye opening.

The zero-crossing detector and the digital filter employ digital techniques and can process signals on a time-shared basis. In one preferred embodiment, the zero-crossing detector and the filter are advantageously arranged to be shared, in common, by a plurality of FSK channels.

The foregoing and other objects and features of this invention will be more fully understood from the following description of illustrative embodiments taken in conjunction with the accompanying drawings.

DETAILED DESCRIPTION

Figure 1:
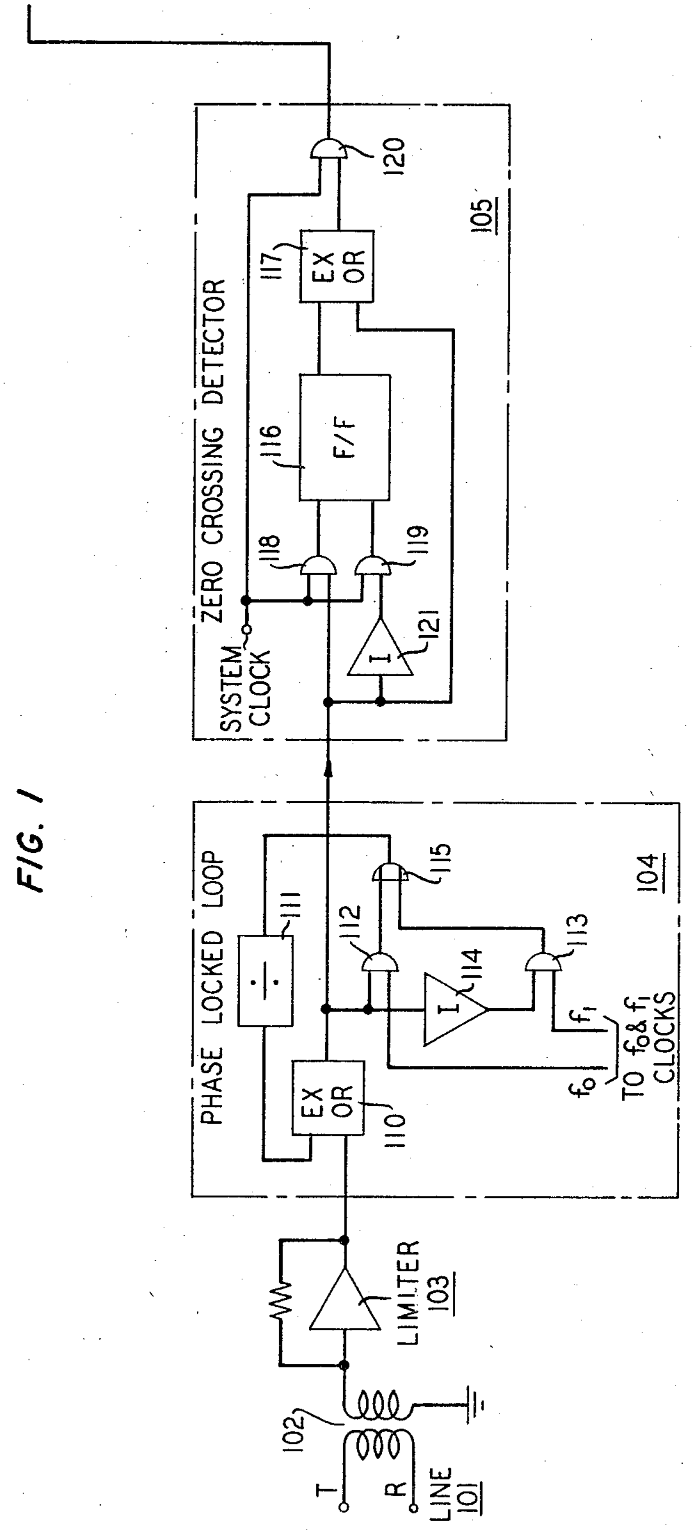
FIG. 1 and FIG. 2, when arranged as shown in FIG. 3, disclose the various circuits which form a discriminator for an FSK signal in accordance with this invention.

In the single-channel FSK demodulator the incoming frequency-shift signals are received over line 101 in FIG. 1. Line 101 is connected across the primary winding of transformer 102. The incoming signals are therefore passed to the secondary winding of transformer 102 and then applied to the input of limiter 103.

Figures 7A, 7B, 7C, 7D, 7E, 7F, 7G, 7H:
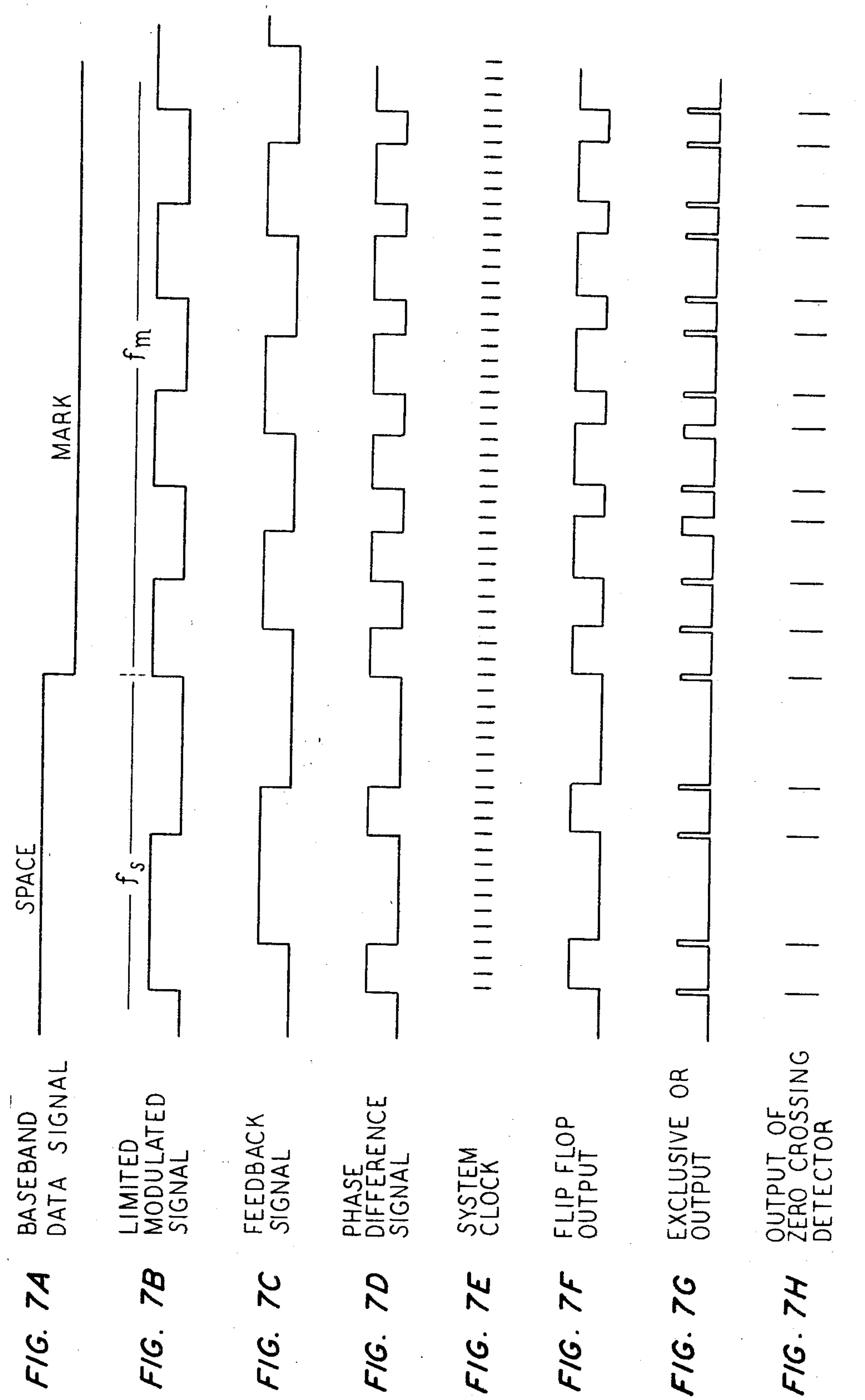
FIGS. 7A through 7H disclose the output waveform of the several circuits which form the discriminator.

Limiter 103 is arranged to provide "hard limiting" of the incoming frequency-shift signal. The output of limiter 103 is therefore a square wave, the crossovers of the square wave corresponding to the crossovers of the incoming frequency-shift signals. A representation of the limited frequency-shift wave is shown in FIG. 7B.

The square-wave output of limiter 103 is passed to phase-locked loop 104. Phase-locked loop 104, which is described in detail hereinafter, is preferably of the type which generates a square wave which is locked in frequency with the incoming square wave and leads or lags the incoming wave by a phase angle which is dependent on the incoming frequency. This generated waveform is shown in FIG. 7C.

The generated square wave and the square-wave output of limiter 103 are phase compared by an EXCLUSIVE-OR circuit which produces a binary signal output whose average amplitude is proportional to the phase difference. This phase difference signal, which comprises the output of phase-locked loop 104, is applied to zero-crossing detector 105. The phase difference wave is depicted in FIG. 7D.

Zero-crossing detector 105 provides at its output binary signal pulses or bits defining each crossing or reversal of the incoming binary phase difference signal. This waveform is shown in FIG. 7H. These zero-crossing pulses are passed to the input of transversal filter 200 in FIG. 2.

Figures 2, 3:
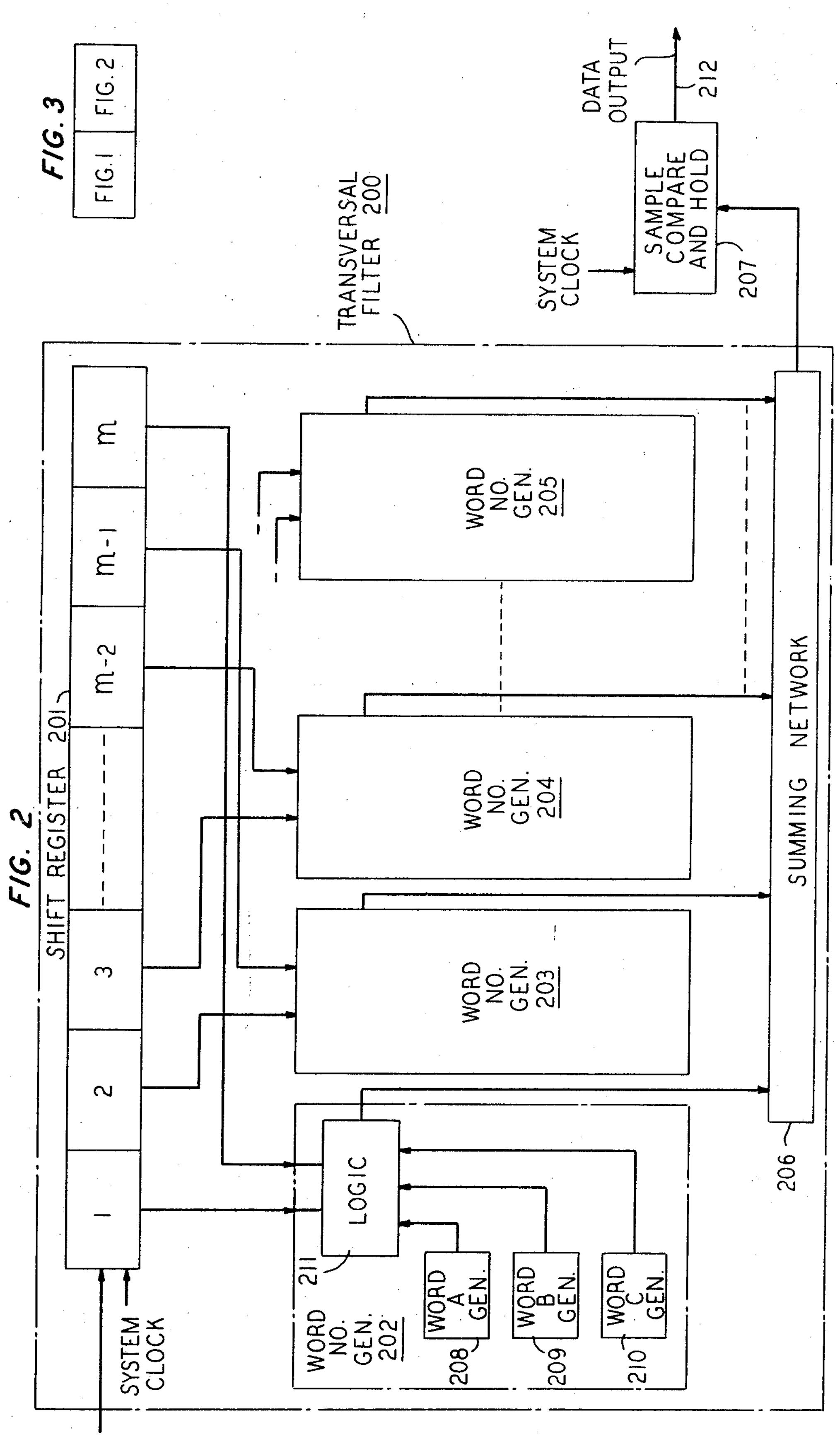

Transversal filter 200 is a digital transversal filter which may be arranged to provide "triangular" weighting of each binary pulse or bit applied thereto. The manner in which the filter provides the "triangular" weighting and a specific arrangement of the filter, as shown in FIG. 2, will be described in detail hereinafter. The output of transversal filter 200 constitutes a digital signal which defines the amplitude of the baseband signal. This digital signal is applied to sample, compare and hold circuit 207.

Sample, compare and hold circuit 207 is a conventional sampling circuit, provided with a suitable threshold and arranged to hold or store data signals as determined by the amplitude of the digital signal output of transversal filter 200. These data signals are then passed to data output terminal 212.

Return now to phase-locked loop 104. A suitable arrangement for this loop is described in U.S. Pat. No. 3,449,691, which issued to G. P. Pasternack et al. on June 10, 1969. As seen in FIG. 1 of the disclosure of the present invention, the incoming frequency-shift signal, which is in the form of a square wave due to limiting, is applied to one input of EXCLUSIVE-OR circuit 110. The other input to EXCLUSIVE-OR circuit 110 is provided by the output of downcount divider 111. The output of EXCLUSIVE-OR circuit 110 passes to the output of phase-locked loop 104 and, in addition, is applied to one input of AND-gate 112 and to one input of AND-gate 113 by way of inverter 114. The other input to AND-gate 112 extends to a high-frequency clock (not shown), whose frequency is defined as $f_0$. The other input to AND-gate 113 is connected to another high-frequency clock whose frequency, defined as $f_1$, is lower than frequency $f_0$. The outputs of AND-gates 112 and 113 are passed through OR-gate 115 and are utilized to drive downcounter 111.

As described in detail in U.S. Pat. No. 3,449,691, EXCLUSIVE-OR circuit 110 provides a binary signal output which is high when either (but not both) the input signal or the feedback signal from the output of downcounter 111 is high. The output of EXCLUSIVE-OR circuit 110 is low when the input signal and the feedback signal are both high or are both low. It can be seen that with the output of EXCLUSIVE-OR circuit 110 high, AND-gate 112 is enabled and the higher frequency $f_0$ drives downcounter 111. With the output of EXCLUSIVE-OR circuit 110 low, AND-gate 113 is enabled and downcounter 111 is driven by the lower frequency $f_1$.

In FIG. 7A, there is depicted the incoming baseband signal waveform with an initial interval when the baseband signal of the frequency-shift signal is a space and a terminal interval when the baseband signal is a mark. In accordance with this specific embodiment, the frequency-shift signal is shifted to a lower frequency when a space is transmitted and shifted to a higher frequency when a mark is transmitted. The corresponding limited signal (*fs*), shown in FIG. 7B, is therefore at a lower frequency when space is received and at a higher frequency (ti fm) when mark is received. It is to be presumed that, at the time designated by the left-hand portion of FIG. 7C, the generated or feedback signal of phase-locked loop 104 has reached the state where it is at the same frequency as the incoming limited signal and lagging the incoming signal by a fixed phase difference. The phase difference signal, FIG. 7D, during this steady condition, has a fixed average amplitude, indicated by the ratio of the width of each binary pulse to the interval between successive pulses.

When the baseband signal goes to mark, the limited signal goes to the higher frequency (*fm*). The feedback signal of phase-locked loop 104 further lags the input signal and the average amplitude of the phase difference signal is increased until the feedback signal is again at the frequency of the incoming signal and lagging by a fixed phase difference which, in this case, is greater than the phase difference when space is received. Thus, the feedback signal (which is the output of downcounter 111) tends to become phase locked to the input signal and the average amplitude of the output of EXCLUSIVE-OR circuit 110 is proportional to the difference in phase between the input and feedback signals.

An examination of the phase difference signal (FIG. 7D) after the transition from space to mark shows increasing width of each positive pulse and decreasing intervals between successive pulses. This results in a relatively smooth transition from the average amplitude denoting space to the average amplitude denoting mark. It is believed that this smoothing at the transition plays a part in providing advantages of the present demodulator, such as greater eye opening of the binary eye pattern and less jitter.

As previously described, the phase difference signal output of phase-locked loop 104 is passed to zero-crossing detector 105. A preferred arrangement of zero-crossing detector 105 is shown in FIG. 1. This detector comprises flip-flop 116, EXCLUSIVE-OR circuit 117, inverter 121 and AND-gates 118 through 120. The phase difference signal is passed to AND-gate 118, EXCLUSIVE-OR circuit 117 and, in addition, to AND-gate 119 by way of inverter 121. AND-gates 118 and 119, together with AND-gate 120, provide sampling of the phase difference signal under the control of a system clock (not shown). The frequency of the clock may be several times the frequency of the incoming frequency-shift signal (but not necessarily related in frequency to the $f_0$ and $f_1$ clocks in phase-locked loop 104). A representation of the clock pulses is shown in FIG. 7E.

Assume now that the phase-locked loop phase difference signal is high. AND-gate 118 is enabled and when a clock pulse is provided, the pulse is passed to the set input of flip-flop 116 and the flip-flop is set. The flip-flop output is thus high as shown in the waveform in FIG. 7F. Concurrently, the high output of phase-locked loop 104 is passed directly to EXCLUSIVE-OR circuit 117. With both inputs to EXCLUSIVE-OR circuit 117 in the high condition, the output of the circuit is low, as depicted by the waveform in FIG. 7G. The low output disables AND-gate 120, precluding the passage of a clock pulse or bit to the output of zero-crossing detector 105.

When a transition in the phase-locked loop output signal occurs, the output goes low. This low condition is passed to EXCLUSIVE-OR circuit 117. Flip-flop 116 is still applying a high condition to the EXCLUSIVE-OR circuit. The output of EXCLUSIVE-OR circuit 117 (FIG. 7G) therefore goes high. AND-gate 120 is therefore enabled and, upon the application of a clock pulse to the gate, a high, or "1," bit is passed to the output of zero-crossing detector 105, as seen in FIG. 7H.

The low phase-locked loop output signal is also inverted by inverter 121. When the clock pulse is generated AND-gate 119 clears flip-flop 116. With flip-flop 116 clear (and after the slight inherent delay of the flip-flop), the output goes low (as seen in FIG. 7F). Low conditions are now applied to both inputs of EXCLUSIVE-OR circuit 117. AND-gate 120 is disabled and the next clock pulse will not pass therethrough.

When the phase-locked loop output signal again goes high, this high condition is again applied to the lower input of EXCLUSIVE-OR circuit 117, as seen in FIG. 1. The output of circuit 117 goes high, AND-gate 120 is enabled and the next clock pulse is passed to the output of zero-crossing detector 105. As previously described, the high phase difference signal again sets flip-flop 116 upon the generation of the system clock pulse. Zero-crossing detector 105 has therefore gone through a complete cycle, providing a pulse or bit for each transition of the phase difference output signal of phase-locked loop 104.

In summary, the output waveform obtained from flip-flop 116 and shown in FIG. 7F follows the phase difference signal output of phase-locked loop 104, as seen in FIG. 7D, and is synchronized to the system clock (except for a slight delay due to the inherent delay of flip-flop 116). The output waveform of EXCLUSIVE-OR circuit 117, as seen in FIG. 7G, comprises pulses, each pulse defining the interval between the transition of the phase difference signal and the following transition of the output of flip-flop 116. The output of zero-crossing detector 105 (FIG. 7H) comprises each system clock pulse which occurs during each pulse interval of the EXCLUSIVE-OR circuit output. Thus, each clock pulse in FIG. 7H defines a transition of the phase difference signal.

The waveform in FIG. 7H comprises a pulse pair for each phase difference pulse signal. These pulse pairs are relatively close to each other when the baseband signal is mark and are relatively far from each other when the baseband signal is space, denoting the high- and low-frequency carrier signals, respectively.

As described above, the phase difference signal after the transition from space to mark, shows a smooth change in the width of each pulse. Similarly, with respect to the pulse pair output from zero-crossing detector 105, after the transition from space to mark, the separation of the pulses in each pair shows a smooth change from pulse pairs each having pulses spaced relatively close to each other to pulse pairs each having pulses spaced relatively far from each other. This smooth change also occurs, in the reverse direction, when the baseband signal goes from mark to space. It is believed that this "formatting" of the phase difference signal by zero-crossing detector 105 to create pulse pairs provides the appropriate digital pulse train input for filter 200 to obtain the advantages of phase-locked loop 104 and to exploit characteristics of filter 200 pointed out below.

The output of zero-crossing detector 105 is passed to filter 200 in FIG. 2. It is noted that filter 200 is a transversal filter with finite memory and therefore the filter response is independent of previously received data. This also aids in providing greater opening of the binary eye pattern.

As previously indicated, transversal filter 200 provides triangular weighting and, therefore, symmetrical weighting of the data. This gives you linear phase response which also tends to improve the eye opening. The components in filter 200 comprise shift register 201, word number generators 202 through 205 and summing network 206. The weighting of the data is determined by the word number generators and, more specifically, by the weights of the word digits generated.

It is noted that word number generator 202 is connected to the first and last stage of shift register 201. Since the weighting is symmetrical, the weights of the first and last stage, the second and next-to-last stage, etc. are always the same. Word number generator 202, therefore, produces a word having one weight if one or the other of the shift register stages connected thereto has a bit thereon, generates a different word having a greater weight if both stages have bits therein, and generates a further word having a lesser weight if neither stage has a bit therein.

The components in word number generator 202 comprise word A generator 208, word B generator 209 and word C generator 210 and logic 211. Two's-complement parallel arithmetic is advantageously utilized. Word A generator 208 continuously generates a positive multibit word (or number) which is applied in parallel to logic 211. Concurrently, word C generator 210 applies a negative multibit word to logic 211, which word has weight that is equal (and opposite) to the weight of the word generated by word A generator 208. Word B generator 209 represents the generation of the "0" word. The function of logic 211 is to gate therethrough to summing network 206 the appropriate multibit number (or word) in accordance with the storage of stages $l$ and $m$ of shift register 201. Logic 211 therefore provides standard static logic which gates the multibit word generated by word A generator 208 when both stages in the shift register have "1" bits therein, gates therethrough the multibit word generated by word B generator 209 when one or the other stage has a bit therein, and gates therethrough the multibit word generated by word C generator 210 when neither stage has a bit therein. Accordingly, upon the generation of each clock pulse by the system clock a multibit word is applied by word number generator 202 to summing network 206 as determined by the bit storage of the first and last stages of shift register 201.

Word number generators 203 through 205 are arranged in substantially the same manner as word number generator 202, with the exception that the word A through word C generators in each of word number generators 203 through 205 provide numbers having increasingly greater weights, with respect to word A through word C generators 208 through 210. This results in the bits in the center stages having greater weights than the bits in the beginning and end stages. Transversal filter 200 thereby operates by providing triangular weighting. Accordingly, word number generator 203, which is connected to stages 2 and $m$–$l$, generates word numbers in accordance with the bits stored in these stages and having a weighting which, for example, is approximately twice the weight of the word provided by word number generator 202. Word number generators 204 and 205 similarly provide multibit numbers in accordance with the stages they are connected to, the weighting increasing as the word generators are connected to stages closer to the center.

Summing network 206 accepts all of the multibit numbers applied thereto by word number generators 202 through 205 and in a conventional manner sums them up to develop a multibit number which defines the sum of the words. Since two's-complement arithmetic is used, the number may be either positive or negative. This feature is advantageously used, as described below.

The multibit number is passed from summing network 206 to sample, compare and hold circuit 207. Sample, compare and hold circuit 207 examines the multibit output number, determines whether its weight is above or below a predetermined threshold, develops a data signal in accordance therewith and stores or holds the data signal until the next multibit number is provided by network 206. Since transversal filter 200 is utilizing two's-complement parallel arithmetic, the "0" quantity can be presumed an appropriate threshold. Sample, compare and hold circuit 207 may therefore simply detect the sign bit of the multibit number to determine whether the number is positive or negative and utilize the clock pulse from the system clock to gate the sign bit to a buffer, such as a flip-flop (not shown). The output of the flip-flop then defines the data signal, which is passed to data output 212.

Figure 4:
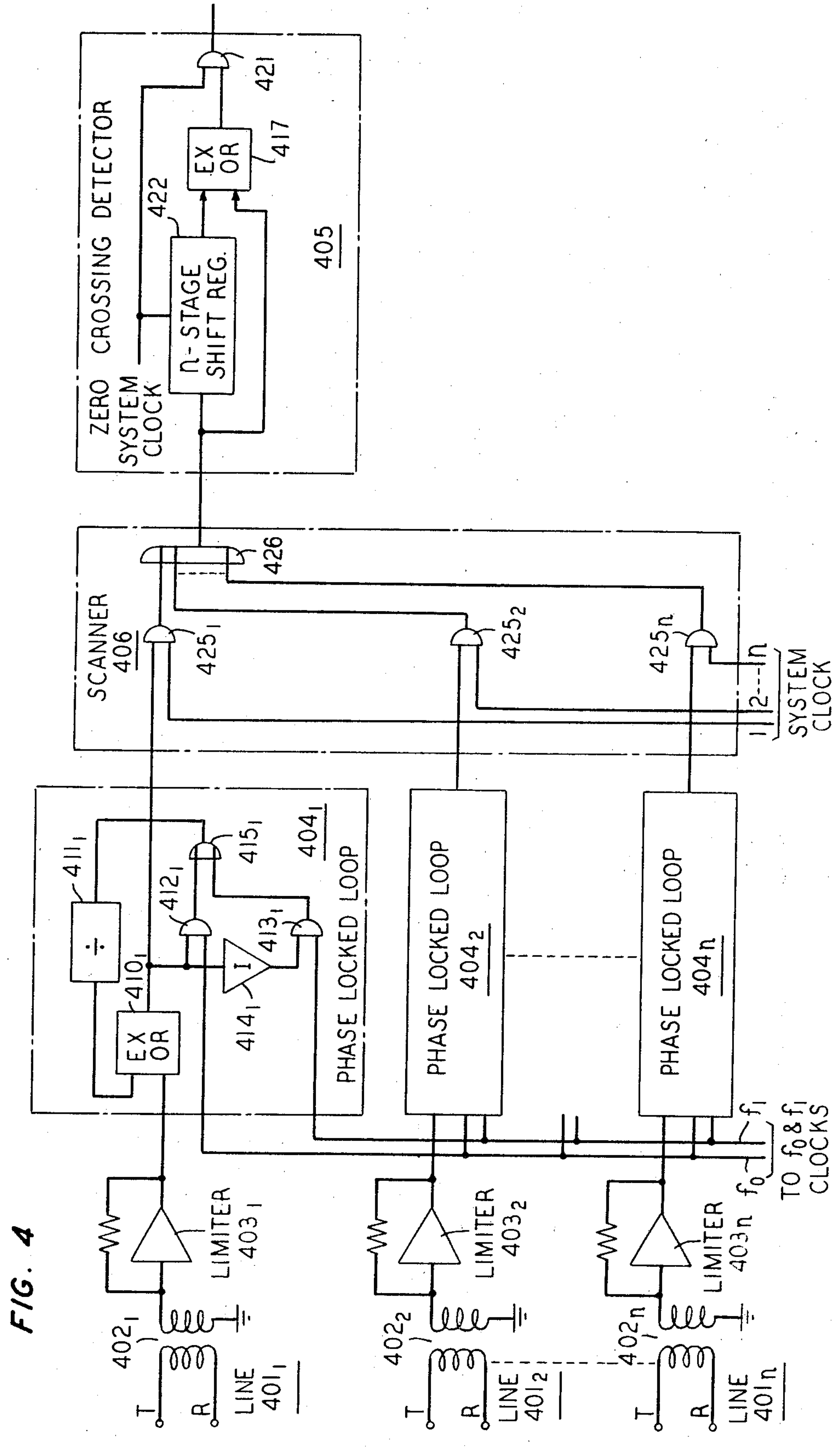
FIG. 4 and FIG. 5, when arranged as shown in FIG. 6, show a discriminator wherein a zero-crossing detector and a digital filter are time shared by a plurality of FSK channels.

The discriminator may be utilized on a time-shared basis and thus be shared by a plurality of lines, such as lines $401_l$ through $401_n$, as shown in FIG. 4. The signals on each of the lines are therefore passed through transformers $402_l$ through $402_n$ to limiters $403_l$ through $403_n$. Limited signals are then applied to phase-locked loops $404_l$ through $404_n$.

Phase-locked loop $404_l$ is arranged in substantially the same manner as phase-locked loop 104, which latter loop was described above in the single-channel arrangement. It is noted, however, that the $f_0$ and $f_l$ clocks in addition to being applied to phase-locked loop $404_l$ are also applied to phase-locked loops $404_2$ and $404_n$. Accordingly, each of the phase-locked loops provides the same function as provided by phase-locked loop 104 in the single channel. The phase error signal outputs of the phase-locked loops are passed to scanner 406. Specifically, the outputs of phase-locked loops $404_l$ through $404_n$ are applied to gates $425_l$ through $425_n$ in scanner 406. Gates $425_l$ through $425_n$ are sequentially enabled by a system clock. This system clock provides $n$ sequential outputs, each output designating a time slot, each time slot defining a time slot for one of the line channels as shown in FIG. 4. The first lead from the system clock extends to gate $425_1$ and therefore the first time slot is allocated to line $401_l$. Similarly, each of the other gates of gates $425_2$ through $425_n$ are sequentially enabled, defining time slots for each of the other lines. Accordingly, samples of the output phase difference signals from the phase-locked loops are sequentially passed through OR-gate 426 in the time slots allocated to each line and applied to zero-crossing detector 405.

Zero-crossing detector 405 detects the zero crossings of the phase difference signal in a manner similar to the zero-crossing detector in the single channel system with the exception that zero-crossing detector 405 operates on a time-shared basis. This is provided by $n$-stage shift register 422 under the control of the system clock, the shift register operating to store the sampled bits of each line, providing at its output the sampled bit of a line concurrently with the application at its input of the next subsequent sampled bit in the same time slot. These bits are concurrently applied to EXCLUSIVE-OR circuit 417, which in the same manner as EXCLUSIVE-OR circuit 117 in FIG. 1, develops a "1" bit when the inputs do not correspond, indicating a signal transition. This "1" bit is then clocked through AND-gate 421 to transversal filter 500 in FIG. 5.

Figures 5, 6:
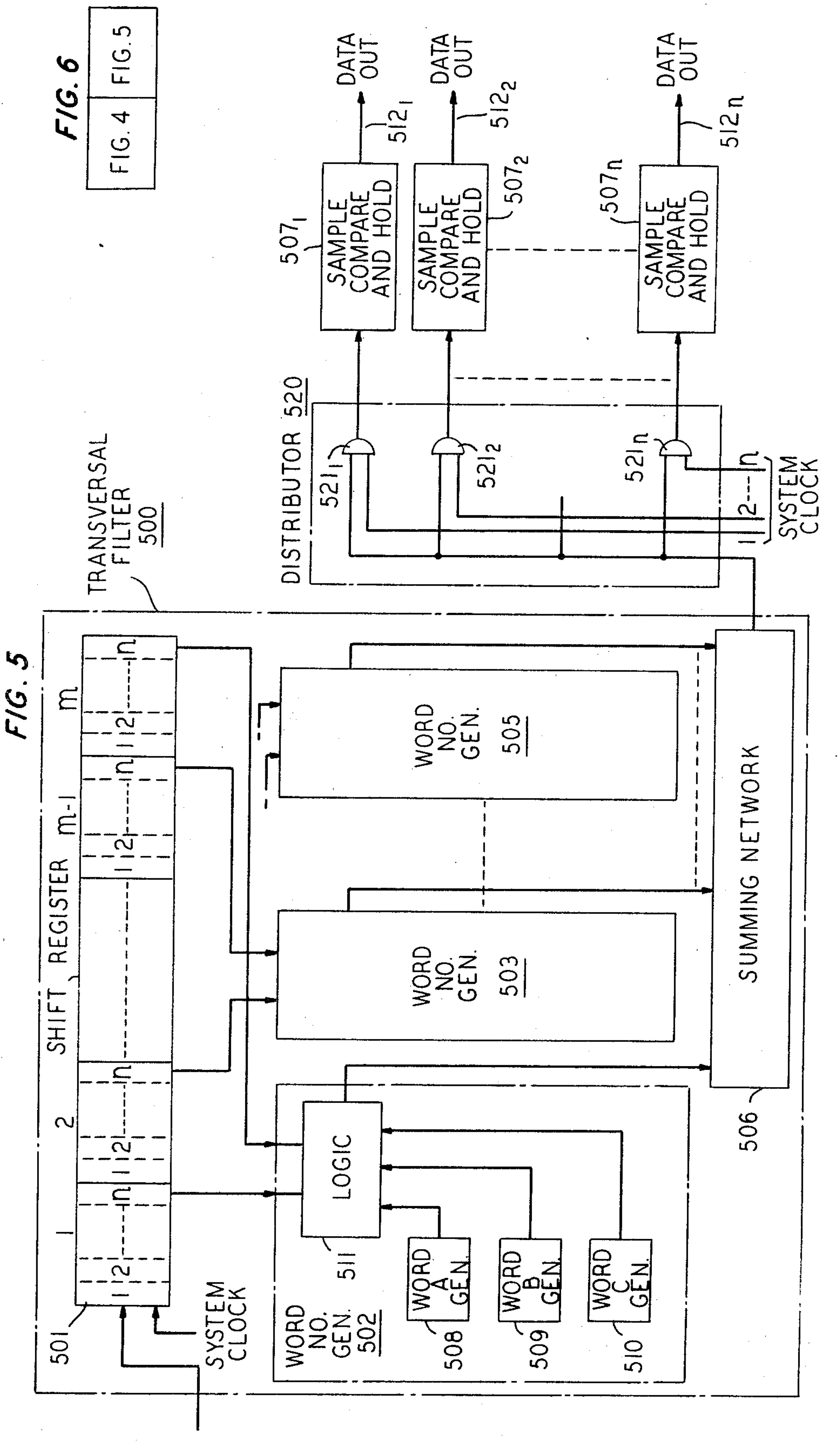

Transversal filter 500 includes components similar to transversal filter 200 in FIG. 2. These components include shift register 501, word number generators 502 through 505 and summing network 506. Shift register 501, however, instead of being provided with *m* stages contains $m \times n$ stages. As seen in FIG. 5, the groupings of the stages are defined in *m* groups, each group containing *n* stages. Thus, the first stage of each of groups 1 through *m* contains the samplings of one line. The second stage in each of groups 1 through *n* contains the samplings of the next successive lines, etc. By connecting the *n*th stage of each of the *m* groups to word numbers 502 through 505, the storage of a single individual line is thus determined. After each successive line is scanned the system clock shifts the bits one stage in shift register 501 and the weighting of the next successive line bits are scanned. Accordingly, during each time slot word number generators 502 through 505 develop the weighted word numbers and apply them to summing network 506.

The output of summing network 506 is passed to distributor 520. Distributor 520 includes gates $521_1$ through $521_n$, which gates are sequentially enabled during the periods corresponding to the time slots of the various lines. Since we have assumed for transversal filter 500 two's-complement parallel arithmetic, it is an advantage for distributor 520 to sample only the sign bit. This bit is therefore distributed by distributor 520 by sample, compare and hold circuits $507_1$ through $507_n$. The latter circuits operate in substantially the same manner as sample, compare and hold circuit 207 in FIG. 2 and therefore develop the data signals for data terminals $512_1$ through $512_n$.

Although a specific embodiment of this invention has been shown and described, it will be understood that various modifications may be made without departing from the spirit of this invention.

We claim:

1. A discriminator for FSK signals comprising a phase-locked loop for generating a signal wave having an average amplitude which varies with the frequency of the FSK signal, a zero-crossing detector for generating a binary pulse for each zero crossing of the signal wave output of the phase-locked loop and a digital filter for processing the binary pulses generated by the zero-crossing detector.

2. A discriminator in accordance with claim 1 wherein the digital filter comprises a transversal filter having finite memory.

3. A discriminator in accordance with claim 2 wherein the digital filter applies triangular weighting to each input binary pulse.

4. A discriminator in accordance with claim 1 wherein the signal wave generated by the phase-locked loop comprises a binary signal.

5. In a multiple data set receiver, a discriminator for FSK signals from a plurality of sources comprising a phase-locked loop for generating, for each of said signal sources, a signal wave having an average amplitude which varies with the frequency of the FSK signal from the source, a zero-crossing detector for generating a binary pulse for each zero crossing of the signal wave output of the phase-locked loop and a digital filter for converting the binary pulse output of the zero-crossing detector to a baseband signal, said digital filter being common to all of said sources and arranged to process the binary pulses derived from all the sources on a time-shared basis.

6. In a multiple data set receiver in accordance with claim 5 wherein the zero-crossing detector is common to all the sources and scanning means samples the outputs of all the phase-locked loops and applies the samples to the common zero-crossing detector.

* * * * *